(12) United States Patent
Ishiyama

(10) Patent No.: US 11,992,906 B2
(45) Date of Patent: May 28, 2024

(54) MACHINE TOOL

(71) Applicant: FANUC CORPORATION, Yamanashi (JP)

(72) Inventor: Naoya Ishiyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 24 days.

(21) Appl. No.: 18/002,073

(22) PCT Filed: Jun. 21, 2021

(86) PCT No.: PCT/JP2021/023300
§ 371 (c)(1),
(2) Date: Dec. 16, 2022

(87) PCT Pub. No.: WO2021/261414
PCT Pub. Date: Dec. 30, 2021

(65) Prior Publication Data
US 2023/0226655 A1    Jul. 20, 2023

(30) Foreign Application Priority Data
Jun. 26, 2020  (JP) ................................. 2020-110304

(51) Int. Cl.
*F16M 13/00*      (2006.01)
*B23Q 1/00*       (2006.01)
*H02G 11/00*      (2006.01)

(52) U.S. Cl.
CPC ......... *B23Q 1/0009* (2013.01); *H02G 11/006* (2013.01)

(58) Field of Classification Search
CPC ....... B23Q 1/0009; B23Q 5/40; H02G 11/006
See application file for complete search history.

(56) References Cited

U.S. PATENT DOCUMENTS 5,125,140 A * 6/1992 Sticht ..................... B65G 21/06
                                                     29/33 P
5,468,101 A * 11/1995 Shoda ..................... B23Q 5/40
                                                     409/145

(Continued)

FOREIGN PATENT DOCUMENTS

CN      111015252 A     4/2020
JP      S60149794 U1    10/1985

(Continued)

OTHER PUBLICATIONS

International Search Report dated Sep. 7, 2021, in International Application No. PCT/JP2021/023300, 9 pages.

*Primary Examiner* — Amy J. Sterling
(74) *Attorney, Agent, or Firm* — Maier & Maier, PLLC

(57) ABSTRACT

A machine tool including a base, a slider that is supported to be linearly movable in a direction with respect to the base, a ball screw configured to cause the slider to linearly move with respect to the base, and a chain-like carrier used for wiring a movable wire body between the base and the slider. The carrier is disposed between the base and the slider and curved in a U-shape around an axis extending in a direction in which the base and the slider are apart from each other, one end of the carrier is fixed to the slider and an other end of the carrier is fixed to the base, and a curved portion of the carrier, which is curved in the U-shape, is disposed at a position where the curved portion crosses an extension line of an axis of the ball screw.

4 Claims, 9 Drawing Sheets

(56) References Cited

U.S. PATENT DOCUMENTS

| | | | | |
|---|---|---|---|---|
| 5,979,038 A * | 11/1999 | Nelson | .................. | B23Q 3/002 |
| | | | | 29/33 P |
| 6,066,078 A * | 5/2000 | Koelblin | .............. | B23Q 39/024 |
| | | | | 483/68 |
| 10,293,442 B2 * | 5/2019 | Chen | ...................... | B23Q 1/015 |
| 2016/0348757 A1 * | 12/2016 | Jaeker | ..................... | G01L 5/106 |

FOREIGN PATENT DOCUMENTS

| | | | |
|---|---|---|---|
| JP | 2002237695 | A | 8/2002 |
| JP | 2003244831 | A | 8/2003 |
| JP | 2003333738 | A | 11/2003 |
| JP | 2006246639 | A | 9/2006 |
| JP | 2011183403 | A | 9/2011 |
| JP | 2018110463 | A | 7/2018 |

* cited by examiner

MACHINE TOOL

TECHNICAL FIELD

The present disclosure relates to a machine tool.

BACKGROUND

There is a known cable carrier that accommodates a movable wire body, such as a movable cable or a movable tube, for supplying power or supplying air or the like to a device mounted on a slider of a linear motion mechanism (for example, see Japanese Unexamined Patent Application, Publication No. 2003-244831). The cable carrier is disposed in a space adjacent to a moving space of the slider so as to be parallel to the moving direction of the slider, is folded back in a U-shape, and has one end fixed to a base and the other end fixed to the slider.

SUMMARY

An aspect of the present disclosure is a machine tool including: a base; a slider that is supported so as to be linearly movable in a direction with respect to the base; a ball screw configured to cause the slider to linearly move with respect to the base; and a chain-like carrier used for wiring a movable wire body between the base and the slider, wherein the carrier is disposed between the base and the slider and curved in a U-shape around an axis extending in a direction in which the base and the slider are apart from each other, one end of the carrier is fixed to the slider and an other end of the carrier is fixed to the base, and a curved portion of the carrier, which is curved in the U-shape, is disposed at a position where the curved portion crosses an extension line of an axis of the ball screw.

DETAILED DESCRIPTION OF THE EMBODIMENTS

In a horizontal linear motion mechanism, such as a stage of a machine tool, in a case in which a cable carrier is folded back in a U-shape in the horizontal direction to reduce the height dimension, it is necessary to avoid interference between a ball screw for driving a slider and the cable carrier. In this case, by placing the cable carrier below the slider so as to be adjacent thereto and by placing the ball screw below the cable carrier, it is possible to avoid interference between the ball screw and the cable carrier.

However, with this structure, the force point where the motive power is applied to the slider is significantly separated from a top surface of the slider, and this may increase vibration at the time of acceleration and deceleration of the slider.

Therefore, it is desired to reduce the height dimension of a linear motion mechanism of a machine tool, while effectively suppressing vibration at the time of acceleration and deceleration of a slider.

A machine tool 1 according to an embodiment of the present disclosure will be described below with reference to the drawings.

Figure 1:
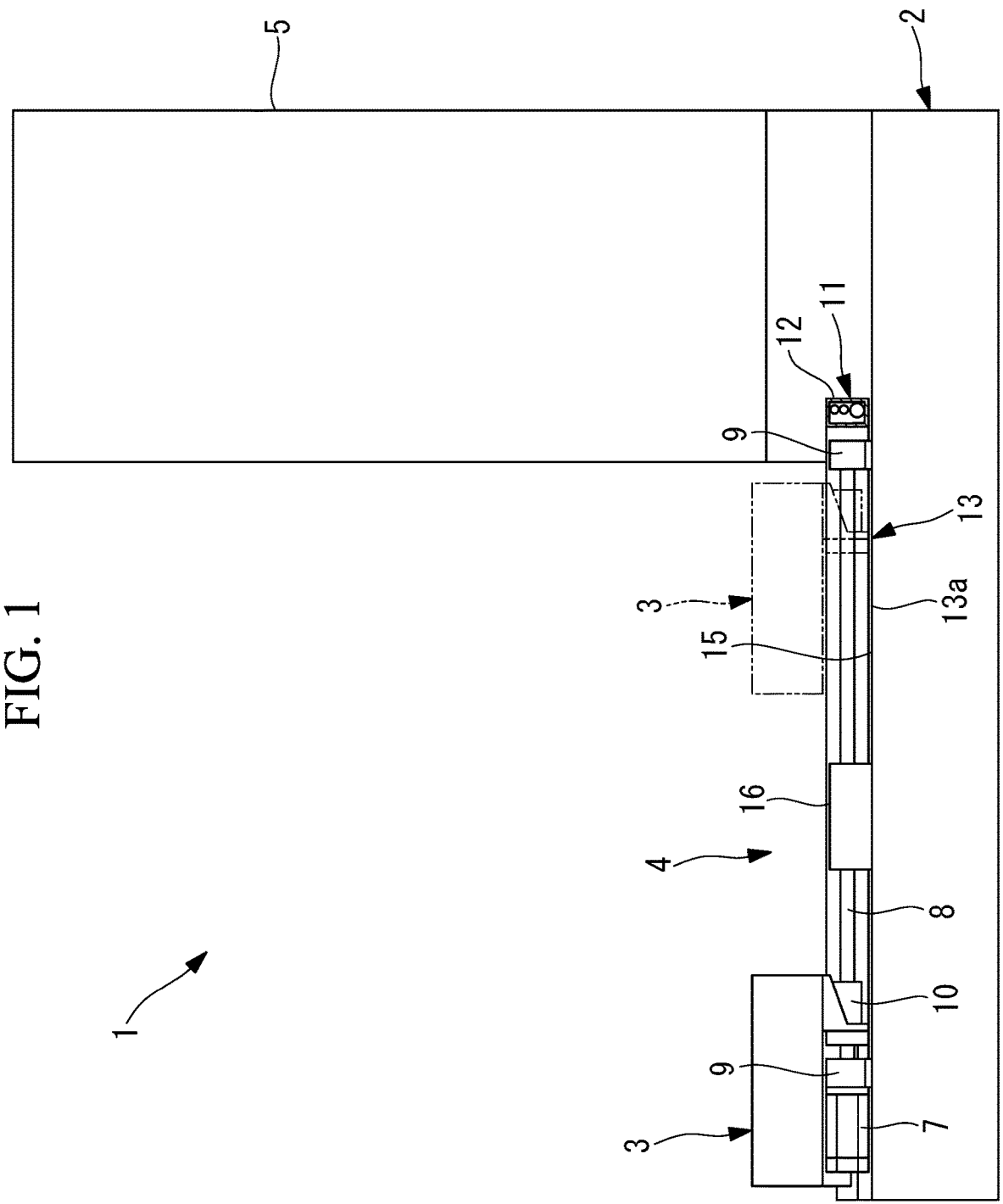
FIG. 1 is a partially cutaway side view showing a machine tool according to an embodiment of the present disclosure.

As shown in FIG. 1, the machine tool 1 according to this embodiment includes: a bed (base) 2 that is installed on the floor; a saddle (slider) 3 that is supported so as to be movable in one horizontal direction with respect to the bed 2; and a drive mechanism 4 that drives the saddle 3 with respect to the bed 2. The bed 2 is provided with a column 5 that supports a spindle (not shown).

Figure 3:
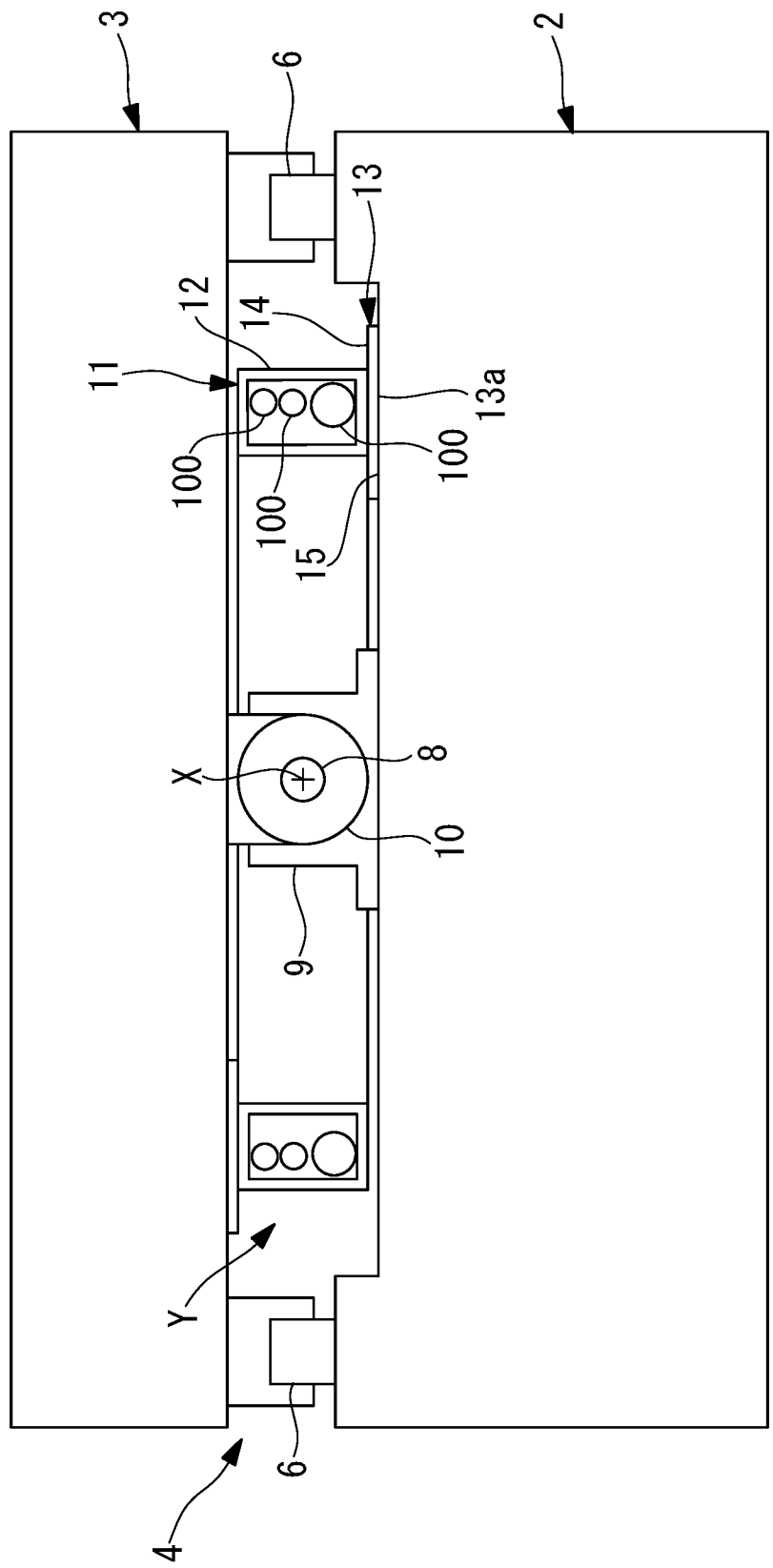
FIG. 3 is a front view for explaining a bed, a saddle, and a drive mechanism of the machine tool in FIG. 1.

The drive mechanism 4 causes the saddle 3 to linearly move from a position close to the column 5 to a position separated from the column 5. As shown in FIG. 3, the drive mechanism 4 includes: two guide rails 6 that support the saddle 3 so as to be movable between the two positions; and a ball screw 8 that is driven by a motor 7. The ball screw 8 and the guide rails 6 are arranged in an accommodation space that horizontally extends below the saddle 3 and that is adjacent to the saddle 3. The guide rails 6 are arranged parallel to the horizontal direction so as to be spaced apart from each other and to extend in the moving direction of the saddle 3.

In an example shown in FIG. 3, the ball screw 8 is disposed at the same height position as the guide rails 6 and at the center between the two guide rails 6 so as to be parallel to the guide rails 6. The motor 7 is connected to one end of the ball screw 8. The ball screw 8 has, at both ends thereof, support brackets 9 that support the ball screw 8 so as to be rotatable about an axis X thereof with respect to the bed 2.

A nut 10 meshes with the ball screw 8. As shown in FIG. 3, the nut 10 is fixed to a lower portion of the saddle 3. When the motor 7 is actuated to rotate the ball screw 8, the nut 10 meshing with the ball screw 8 is moved in the longitudinal direction of the ball screw 8. Accordingly, the saddle 3 to which the nut 10 is fixed is driven in the longitudinal direction of the ball screw 8.

Figure 2:
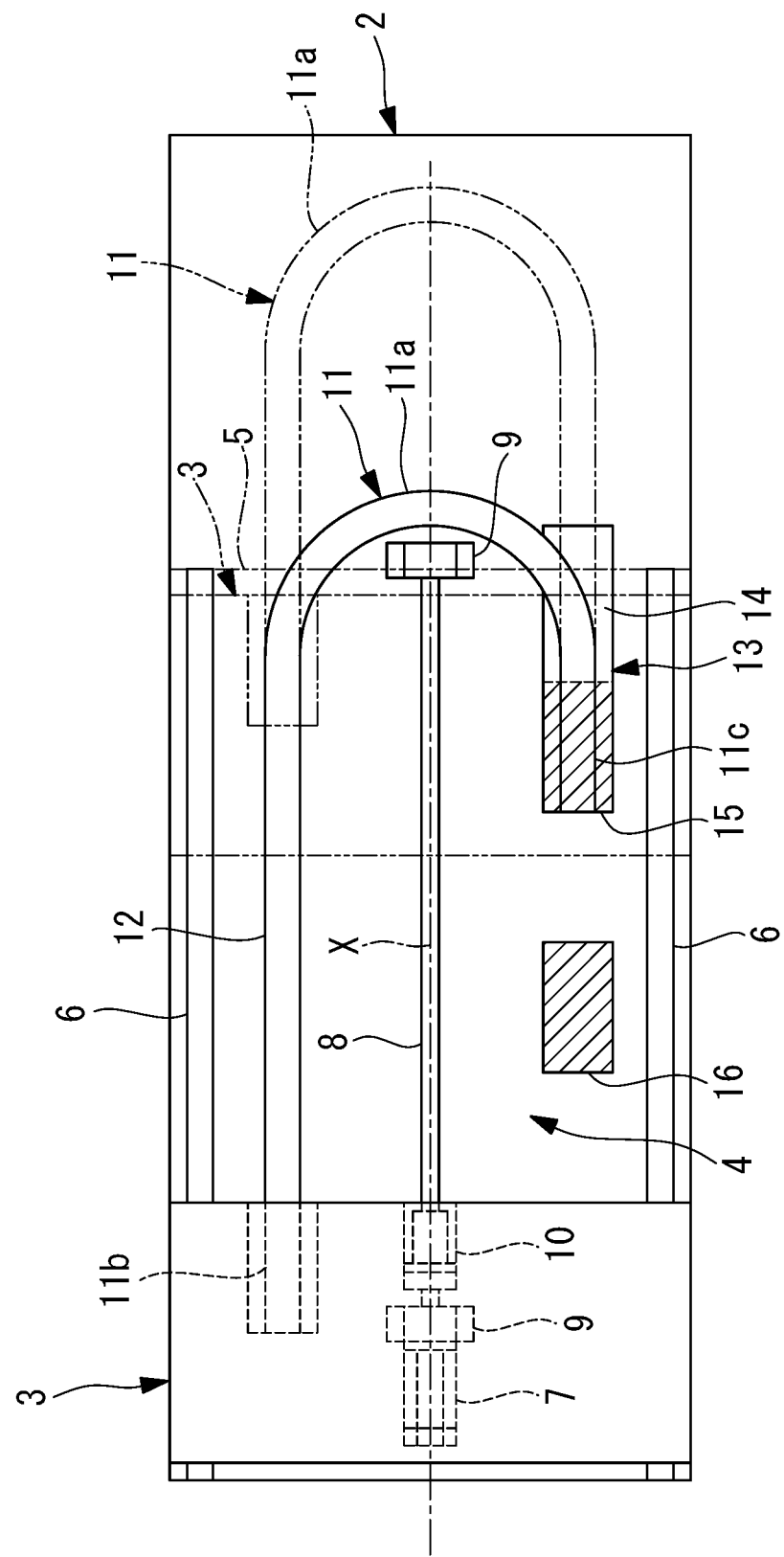
FIG. 2 is a plan view of the machine tool in FIG. 1.

Therefore, as shown in FIGS. 1 and 2, the ball screw 8 is disposed over substantially the entire length of the moving range of the saddle 3.

In this embodiment, the motor 7 connected to the one end of the ball screw 8 is disposed on one end side of the bed 2, and the support bracket 9 that supports the other end of the ball screw 8 is disposed at a position close to the column 5.

In addition, the machine tool 1 according to this embodiment includes a chain-like carrier 11 for wiring a movable wire body 100, such as a movable cable or a movable tube, between the bed 2 and the saddle 3. The carrier 11 includes a plurality of pieces 12 that are connected to each other so as to be individually rotatable about a plurality of axes parallel to each other. The movable wire body 100 is inserted into an elongated internal space formed inside the plurality of connected pieces 12.

In this embodiment, the carrier 11 is disposed in the same accommodation space Y as the ball screw 8 and the guide rails 6. As shown in FIG. 2, the carrier 11 has one end 11b fixed to a bottom surface of the saddle 3, the one end 11b extending parallel to the ball screw 8 in a space between one of the guide rails 6 and the ball screw 8.

In addition, the carrier 11 is folded back by being curved in a U-shape around an axis extending in a direction in which the bed 2 and the saddle 3 are spaced apart from each other, which is a vertical direction in this embodiment. The carrier 11 has a U-shaped curved portion 11a extending around the support bracket 9 on the other end side of the ball screw 8, and has the other end fixed to the bed 2, the other end extending parallel to the ball screw 8 in a space between the other guide rail 6 and the ball screw 8.

In other words, the curved portion 11a of the carrier 11, which is curved in a U-shape, is disposed at a position where the curved portion 11a crosses an extension line of the axis X of the ball screw 8. In addition, the other end of the ball screw 8 extends to a position close to the column 5 in order to move the saddle 3 to the position close to the column 5. Thus, the curved portion 11a of the carrier 11, which extends around the support bracket 9 on the other end side, is disposed in a space formed below the column 5.

As shown in FIG. 2, another end 11c of the carrier 11 is fixed to the bed 2 with a guide member 13 interposed therebetween. The guide member 13 is a flat plate-shaped member including a support plane 14 to which a piece 12 positioned at an outermost end portion of the other end 11c of the carrier 11 is fixed. The support plane 14 slidably supports a bottom surface of another piece 12 connected to the piece 12 at the outermost end portion. In addition, the guide member 13 includes a common attachment surface 13a for attaching the guide member 13 to a first seating surface (seating surface) 15 and a second seating surface (seating surface) 16 provided on the bed 2.

For example, the first seating surface 15 and the second seating surface 16 of the bed 2 are provided with screw holes (not shown), and the attachment surface 13a is provided with through-holes (not shown) at positions that coincide with the screw holes when the attachment surface 13a is placed on the first seating surface 15 or the second seating surface 16. The guide member 13 can be detachably fixed to the first seating surface 15 or the second seating surface 16 in a selective manner by fastening bolts penetrating through the through-holes into the screw holes.

Figure 4:
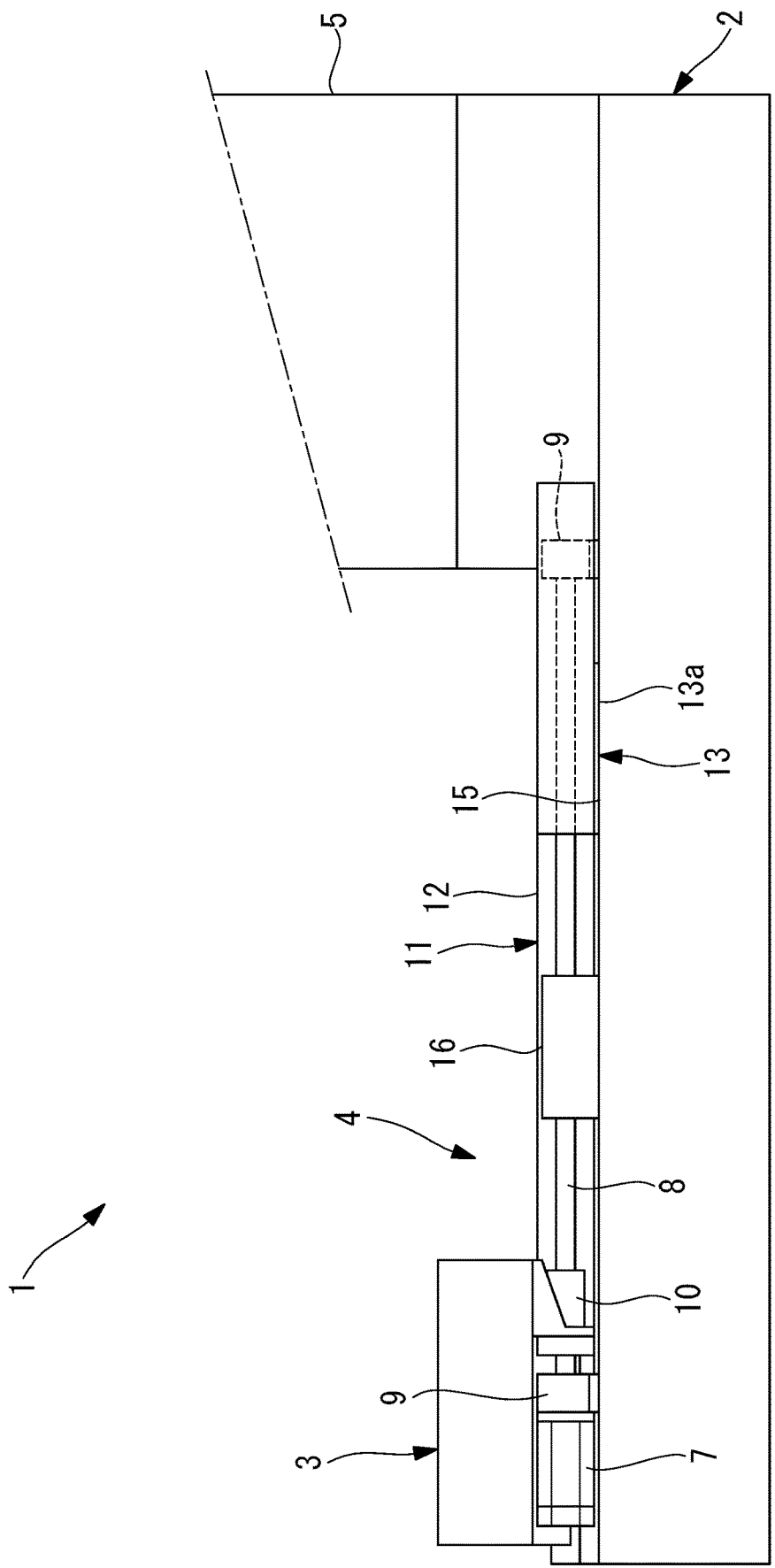
FIG. 4 is a side view showing a state in which a guide member of the machine tool in FIG. 1 is fixed to a first seating surface.

As shown in FIG. 4, the first seating surface 15 can fix the carrier 11 to the bed 2 at the position where the curved portion 11a crosses the extension line of the axis X of the ball screw 8.

The second seating surface 16 is disposed at a position closer to the motor 7 than the first seating surface 15 is in the moving direction of the saddle 3, and also the second seating surface 16 is disposed at a position higher than the first seating surface 15. When the guide member 13 fixed to the first seating surface 15 is detached therefrom and fixed to the second seating surface 16, as shown in FIGS. 5 and 6, the other end 11c of the carrier 11 is moved toward the motor 7 and is also pulled upward.

Figure 5:
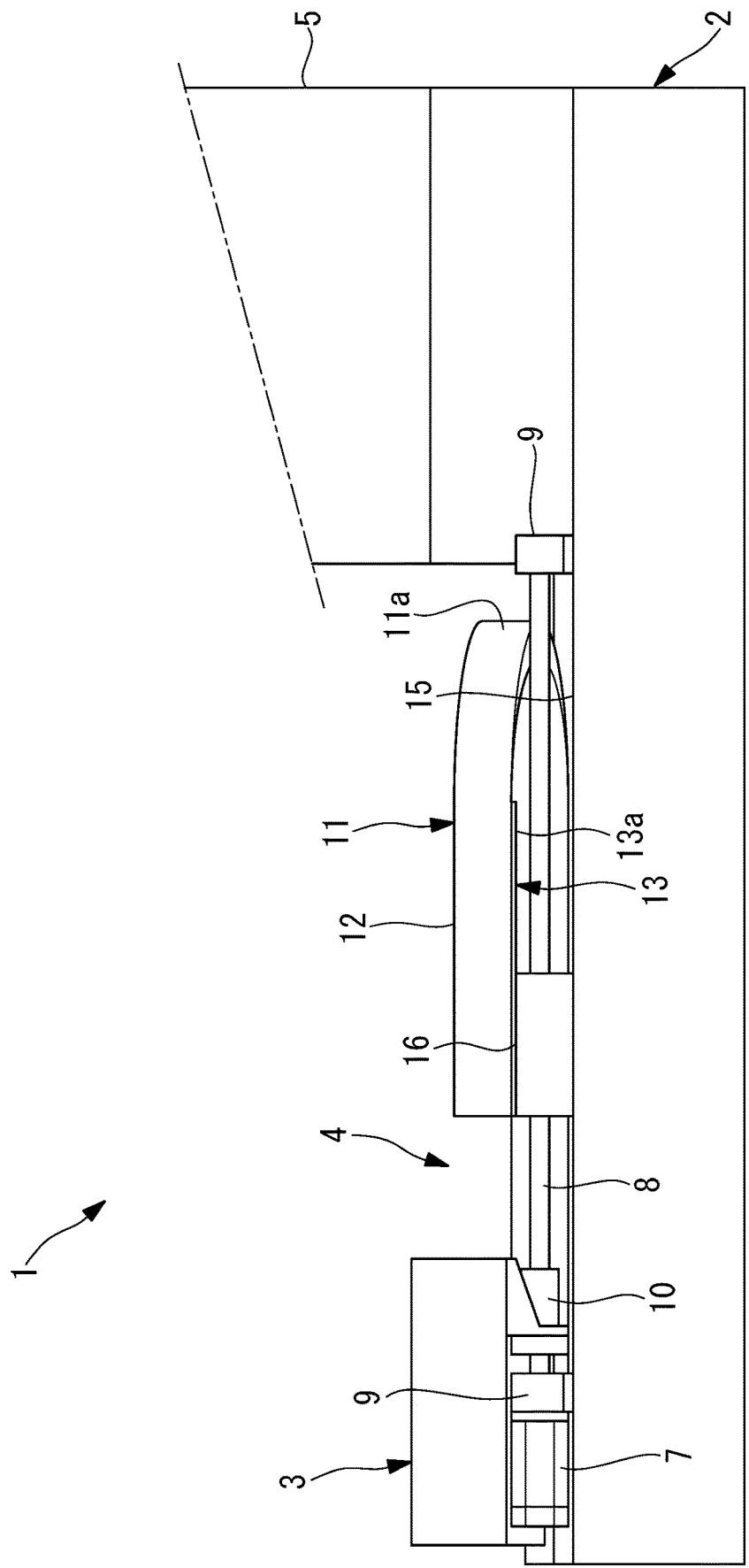
FIG. 5 is a side view showing a state in which the guide member of the machine tool in FIG. 1 is fixed to a second seating surface.
Figure 6:
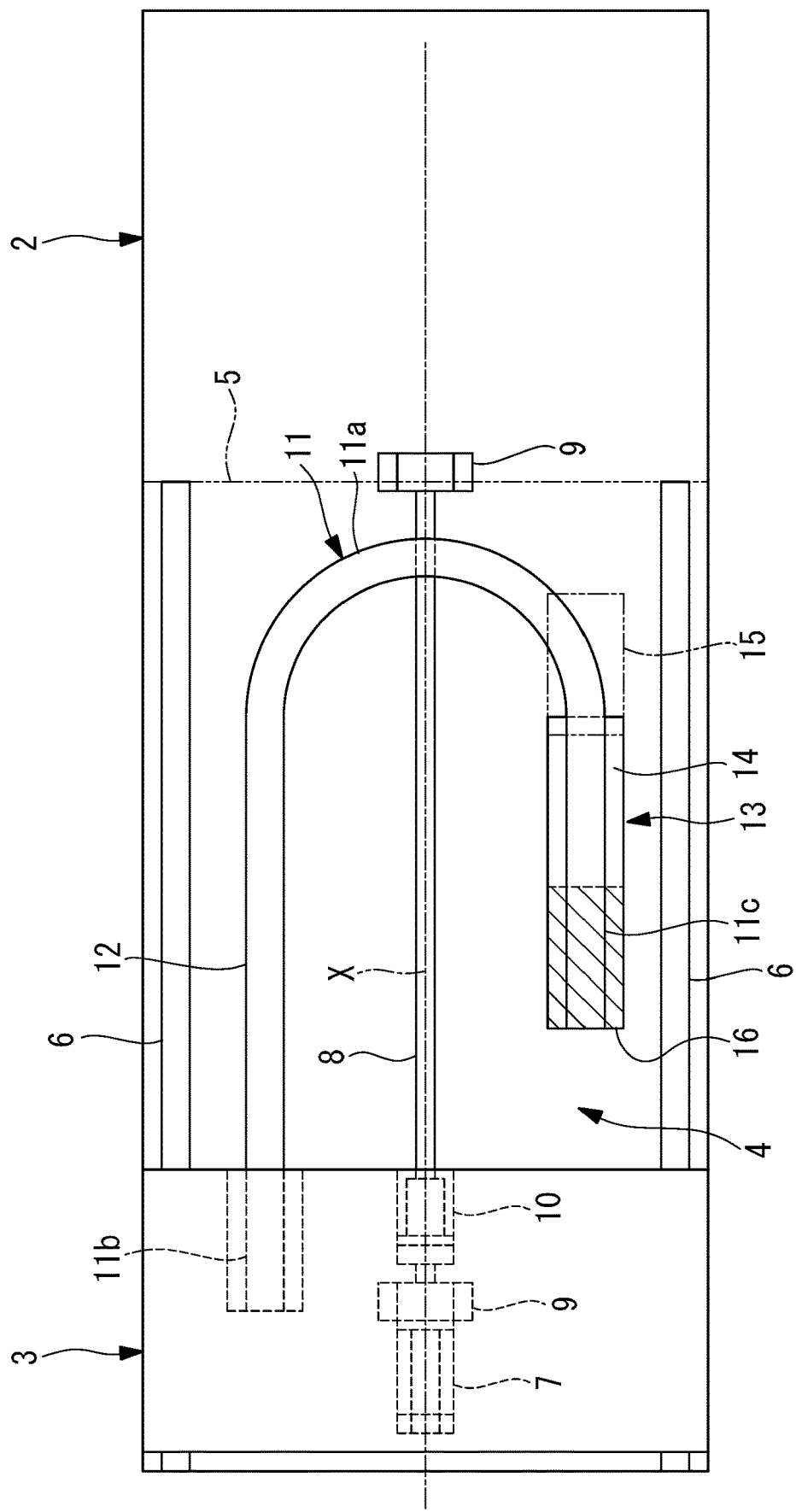
FIG. 6 is a plan view of the machine tool in FIG. 5.
Figure 7:
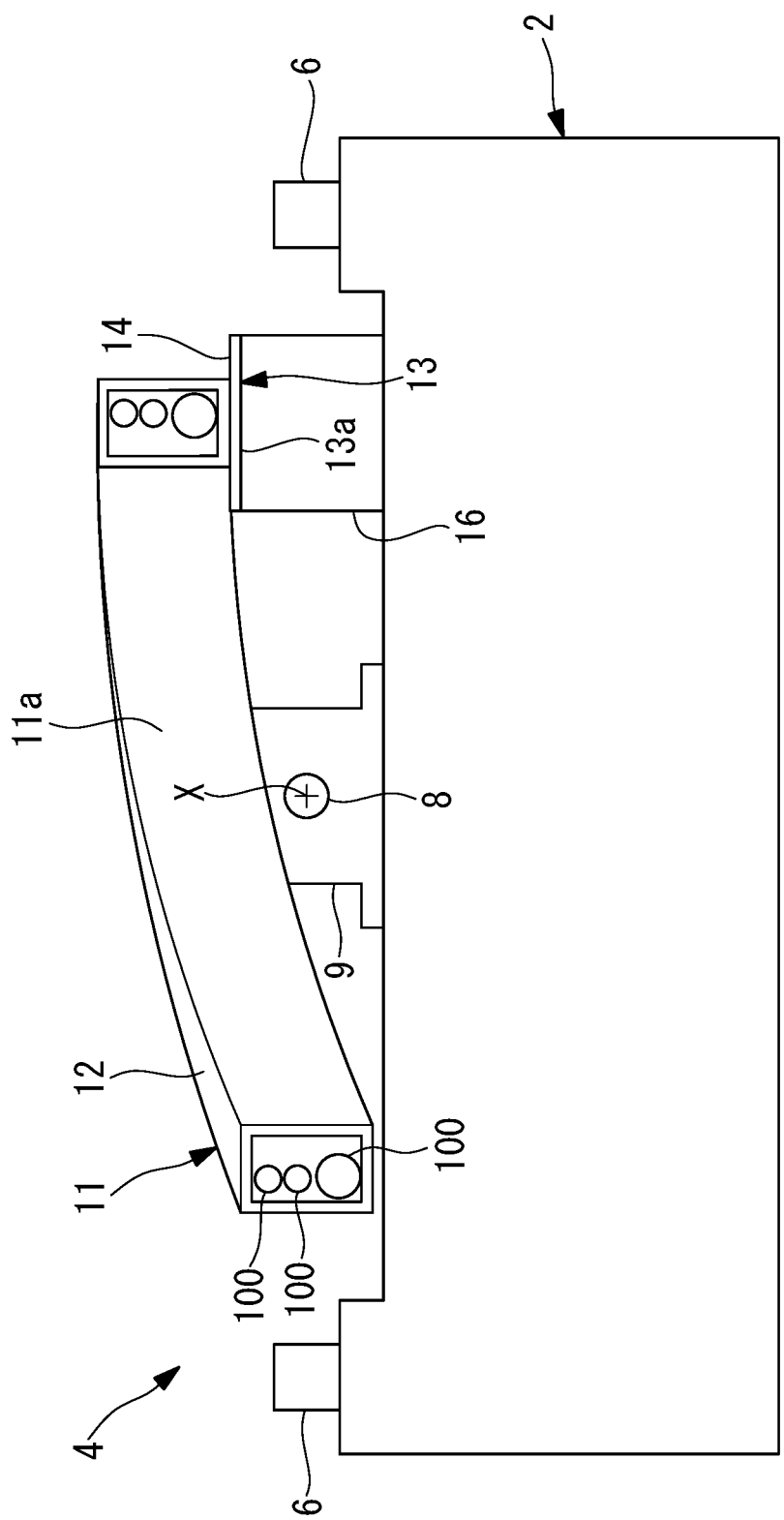
FIG. 7 is a front view for explaining a curved portion of a carrier of the machine tool in FIG. 5.

By doing so, as shown in FIGS. 5 and 7, the other end 11c side of the carrier 11, which is fixed to the bed 2, is disposed at a position higher than the one end 11b side thereof, which is fixed to the saddle 3, and the curved portion 11a connecting the two ends is obliquely raised from the one end 11b side toward the other end 11c side. In other words, by detaching the guide member 13 from the first seating surface 15 and fixing the guide member 13 to the second seating surface 16, the curved portion 11a of the carrier 11, which has been disposed in the space below the column 5, can be drawn out from below the column 5 and disposed at a position above the ball screw 8.

The operation of the thus-configured machine tool 1 according to this embodiment will be described below.

With the machine tool 1 according to this embodiment, when the motor 7 is actuated to rotate the ball screw 8, the nut 10 meshing with the ball screw 8 moves along the axis X of the ball screw 8, and thus, it is possible to move the saddle 3 to which the nut 10 is fixed in the axis X direction of the ball screw 8.

Because the one end 11b of the carrier 11 is fixed to the saddle 3, the one end 11b of the carrier 11 is moved in accordance with the movement of the saddle 3. As a result, the carrier 11 changes the position of the curved portion 11a, and places the movable wire body 100 inserted in the interior thereof in a predetermined wiring path while protecting the movable wire body 100.

During the operation of the machine tool 1, the guide member 13 fixing the other end 11c of the carrier 11 is fixed to the first seating surface 15 of the bed 2.

By doing so, it is possible to place the curved portion 11a of the carrier 11 at the position where the curved portion 11a crosses the extension line of the axis X of the ball screw 8, and to suppress the height dimension of the accommodation space Y in which the ball screw 8 and the carrier 11 are arranged.

In other words, there is an advantage in that it is possible to place the ball screw 8 close to the saddle 3, and to improve the rigidity of the saddle 3 by bringing the force point where the driving force is input from the ball screw 8 to the saddle 3 close to the saddle 3, thereby suppressing vibration of the saddle 3 at the time of acceleration and deceleration thereof.

In addition, in this embodiment, the curved portion 11a of the carrier 11 is disposed in the space below the column 5, in which the ball screw 8 is not disposed, in order to arrange the ball screw 8 and the carrier 11 at the same height position. Therefore, as shown in FIG. 2, it is difficult to perform maintenance of the movable wire body 100 inside the carrier 11 in a state in which the guide member 13 is fixed to the first seating surface 15.

Accordingly, in this embodiment, the saddle 3 is moved to a position farthest from the column 5, for example, during maintenance of the movable wire body 100, and the guide member 13 is subsequently detached from the first seating surface 15 and, as shown in FIG. 6, is fixed to the second seating surface 16. In order to fix the guide member 13 to the second seating surface 16, which is disposed at a position closer to the motor 7 than the first seating surface 15 is and also at a position higher than the first seating surface 15, the other end 11c of the carrier 11, which is fixed to the guide member 13, is raised while being moved toward the motor 7.

By doing so, the curved portion 11a of the carrier 11, which has been accommodated in the space below the column 5, can be drawn to the outside from the space below the column 5 and disposed at a position above the ball screw 8. In other words, there is an advantage in that it is possible to expose the entire carrier 11 to the outside of the column 5, and thus to easily access the movable wire body 100 inside the carrier 11 for maintenance work, such as replacement of the movable wire body 100.

Figure 8:
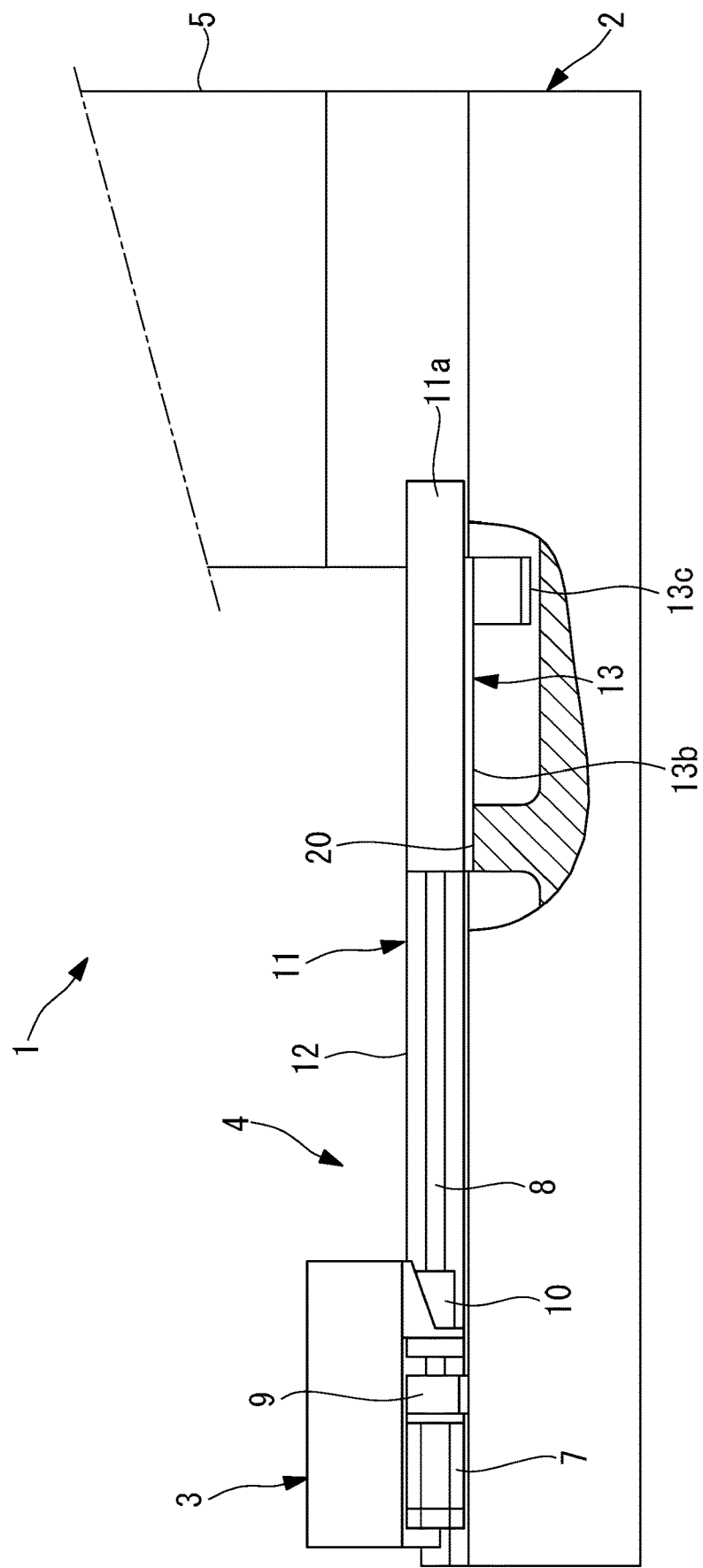
FIG. 8 is a partially cutaway side view of a modification of the machine tool in FIG. 1, showing a state in which the guide member is fixed to a seating surface of the bed by means of one attachment surface.
Figure 9:
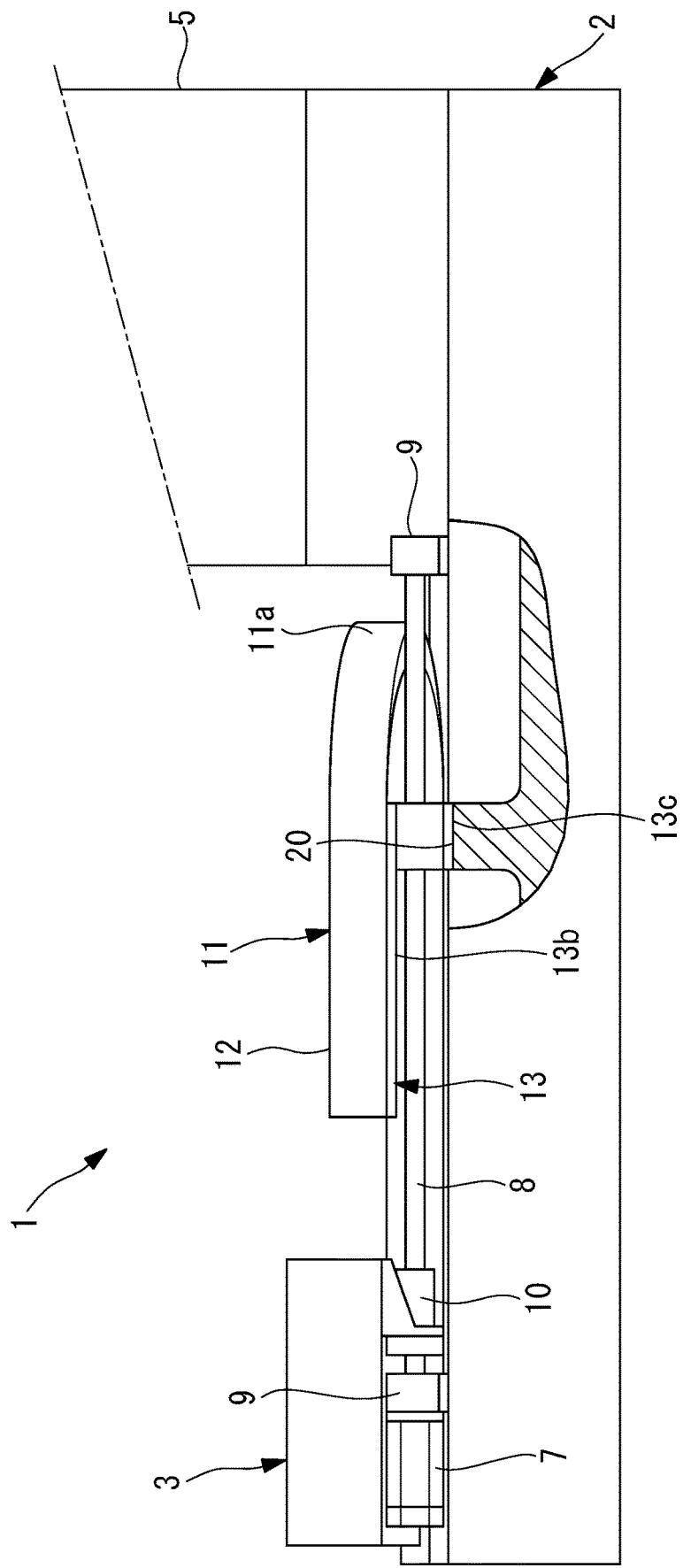
FIG. 9 is a partially cutaway side view of the machine tool in FIG. 8, showing a state in which the guide member is fixed to the seating surface of the bed by means of the other attachment surface.

Note that, in this embodiment, the bed 2 is provided with the first seating surface 15 and the second seating surface 16 that are disposed at different positions in the moving direction of the saddle 3 and that have different heights, and the position where the common attachment surface 13a of the guide member 13 is attached is switched from the first seating surface 15 to the second seating surface 16. Alternatively, as shown in FIGS. 8 and 9, the guide member 13 may be provided with two attachment surfaces 13b, 13c that are disposed at different positions in the moving direction of the saddle 3 and that have different heights, and may be selectively attached to one seating surface 20 provided on the bed 2.

In addition, the case in which the saddle 3 is moved in the horizontal direction has been illustrated as an example of the machine tool 1 according to this embodiment; however, the machine tool 1 is not limited thereto and may be applied to a case in which the saddle 3 is moved in another direction, such as a vertical direction.

The invention claimed is:

1. A machine tool comprising:
   a base;
   a slider that is supported to be linearly movable in a direction with respect to the base;
   a ball screw configured to cause the slider to linearly move with respect to the base; and
   a chain-like carrier used for wiring a movable wire body between the base and the slider,
   wherein the carrier is disposed between the base and the slider and curved in a U-shape around an axis extending in a direction in which the base and the slider are apart from each other,
   one end of the carrier is fixed to the slider and an other end of the carrier is fixed to the base, and
   a curved portion of the carrier, which is curved in the U-shape, is disposed at a position where the curved portion crosses an extension line of an axis of the ball screw.

2. The machine tool according to claim 1, wherein
   the slider is supported so as to be movable in a horizontal direction,
   the machine tool comprises a guide member to which the other end of the carrier is fixed, and
   the guide member includes a horizontal support plane that supports a bottom surface of the carrier that moves in accordance with the movement of the slider, and is configured to be attached to the base in a detachable manner, at one of a first position where the curved portion is disposed at the position where the curved portion crosses the extension line of the axis of the ball screw and a second position where the curved portion is disposed at a position where the curved portion crosses an area above the ball screw.

3. The machine tool according to claim 2, wherein
   the base includes a seating surface to which the guide member is detachably fixed, and
   the guide member includes two attachment surfaces configured to place the guide member at the first position or the second position by being selectively fixed to the seating surface.

4. The machine tool according to claim 2, wherein
   the base includes two seating surfaces to which the guide member is detachably fixed, and
   the guide member includes an attachment surface configured to place the guide member at the first position or the second position by being fixed to one of the seating surfaces.

* * * * *